United States Patent Office 2,756,217
Patented July 24, 1956

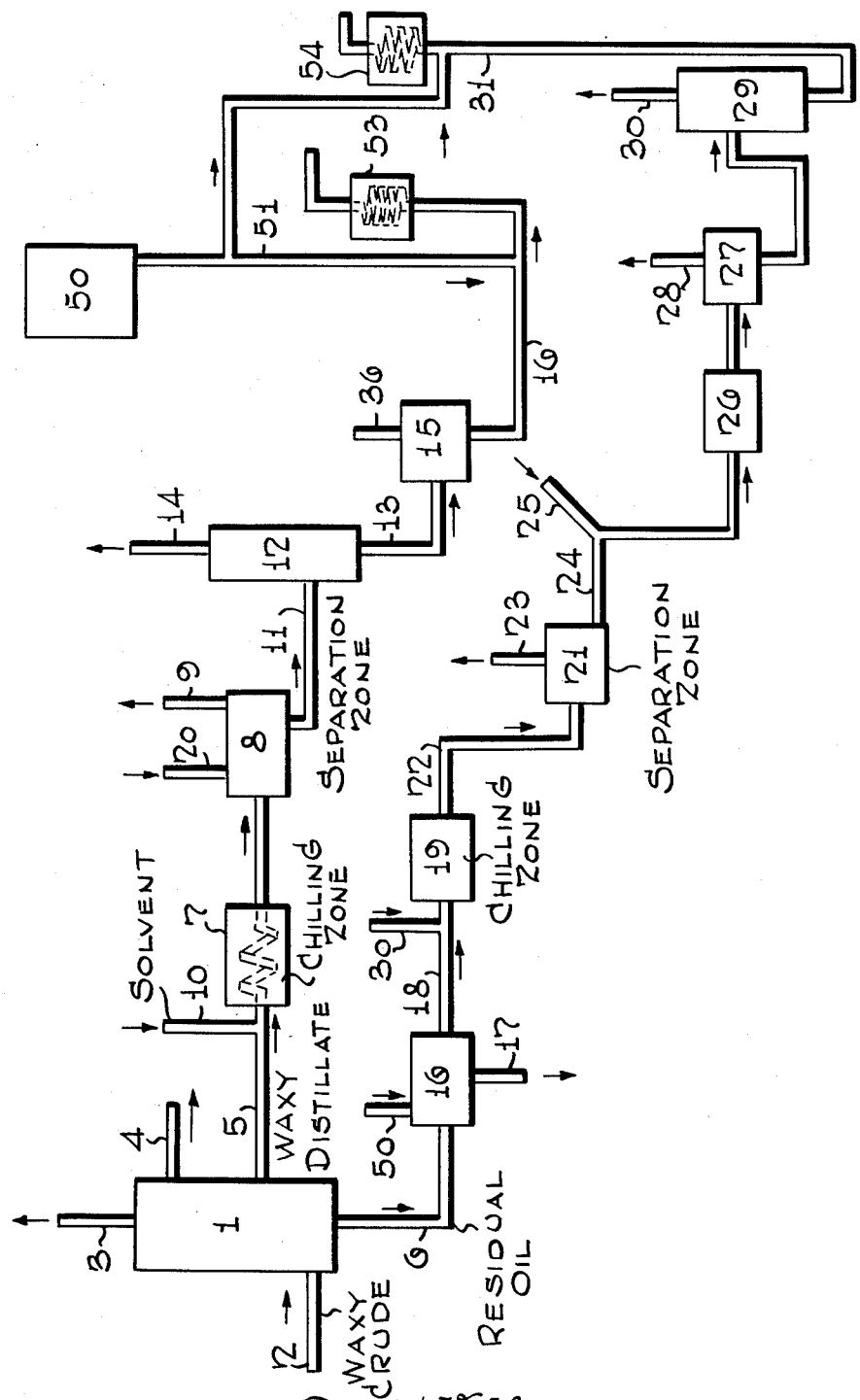

2,756,217

WAX COMPOSITION CONTAINING AN OILY BUTADIENE-STYRENE COPOLYMER

David W. Young, Westfield, Delmer L. Cottle, Highland Park, and Anthony H. Gleason, Westfield, N. J., assignors to Esso Research and Engineering Company, a corporation of Delaware Application June 17, 1952, Serial No. 294,012

18 Claims. (Cl. 260—28.5)

The present invention is concerned with the production of petroleum hydrocarbon wax compositions of enhanced adhesive properties particularly suitable as coating and laminating agents. The compositions of the present invention comprise a small proportion of a copolymer of styrene and butadiene with wax, which may comprise either microcrystalline wax or scale wax. The invention is more particularly concerned with the production of a material impervious to fluid comprising a fibrous material coated or impregnated with a laminating wax composition containing a critical amount of a copolymer of styrene and butadiene. A particularly desirable wax composition of the present invention comprises the use of polyethylene in conjunction with the copolymer of styrene and butadiene in wax compositions.

In the refining of hydrocarbon oils such as petroleum oils, it is known to segregate paraffin waxes from so-called paraffin distillates, waxy lubes and the like. The segregation of these waxes is secured by a number of processes. For example, it is known to chill the selected wax containing fraction in order to secure crystallization of the wax and to remove the wax crystals from the oil by filtering, centrifuging and the like. It is also known to use various dewaxing solvents such as liquid normally gaseous hydrocarbons, such as propane, as well as other solvents, such as methylethyl ketone and the like. It is also known to utilize in dewaxing operations solvent mixtures wherein one solvent comprises a wax precipitating solvent while the other comprises a solvent having a high solubility for oil. A solvent mixture of this character, for example, comprises 60% by volume of toluene and 40% by volume of methylethyl ketone. In utilizing a mixture of this character, it has been the practice to add the mixture in toto or incrementally to the waxy distillate as it is being chilled. In dewaxing operations, it is also known to use various filter aids and other agents in order to render the dewaxing and filtering operations more efficient.

The wax segregated from the hydrocarbon oil, usually termed "slack wax," contains from about 10% to 40% of oil. The slack wax is refined usually by conventional sweating to produce "crude scale wax" in a manner to reduce the oil content to less than about 5% by weight. The slack wax may be distilled to obtain the desired boiling range wax prior to sweating, if desired. This "crude scale wax" generally has an oil content of about 2% to 3% by weight. In order to remove this oil from the scale wax to produce a refined wax having an oil content below about .5%, usually below about .3%, various procedures have been proposed and employed.

It is also known in the art to segregate microcrystalline waxes from residual oils. These microcrystalline waxes are of a relatively high melting point and of different crystalline structure. The microcrystalline or petrolatum waxes may be prepared from any of the paraffin or mixed base crude oils. The undistilled residue may be treated with sulfuric acid and neutralized to remove the tarry matter and unsaturated hydrocarbons. The undistilled residue also may be deasphalted. The treated stock, containing a fairly high percentage of wax, as evidenced by a very high pour point, may be dewaxed by blending with a dewaxing solvent, such as propane, methyl-ethyl-ketone-benzol, or petroleum naphtha and chilled, and filtered or centrifuged to separate the petrolatum wax from the oil solution.

This deoiling operation produces a wax containing some oil and solvent. The wax after removal of the solvent has a melting point of from about 122° F. to 180° F. The wax may be again put in solution with more solvent or naphtha and chilled, and filtered or recentrifuged to further reduce the oil content. The wax which separates in either of these operations is referred to as crude petrolatum wax. The wax separated in the second deoiling process after stripping to remove solvent is fairly dry and of a low oil content. This wax should not be confused with petroleum jellies which contain large amounts of oil. The crude petrolatum wax may be again put into solution with naphtha and filtered through clay or an equivalent material in order to improve its color. The clay filtered solution is distilled to remove the naphtha, the residue being a refined petrolatum wax having a melting point within the range of about 122° F. to 180° F. The source of the crude oil and the oil content of the refined microcrystalline product will affect the melting point of the final wax product. The refined petrolatum wax, sometimes called amorphous wax, is of very small crystal structure.

Hydrocarbon waxes produced as described above have been extensively used in the coating art, particularly where liquid proofness and moisture proofness are desired. In accordance with the present invention improved laminating waxes having a high degree of adhesiveness are produced by utilizing in conjunction with petroleum waxes a copolymer of styrene and butadiene.

The copolymer of styrene and butadiene comprises a polymer comprising 15-25% of styrene and from 75-85% of butadiene. These copolymers, useful for the purposes of this invention, are those having intrinsic viscosities in the range of about 0.08 to 0.30. They may be prepared by polymerization in solution under pressure with sodium as the catalyst according to the following:

80 parts butadiene
20 parts styrene
250 parts petroleum naphtha
1.7 parts metallic sodium (20–50 microns)
30 parts dioxane
0.2 parts isopropyl alcohol Reaction is complete in about 6 hours at 120° F. The catalyst is quenched with 8.5 parts glacial acetic acid and any unreacted acid is neutralized with anhydrous ammonia. After removal of the sodium and ammonium acetates by filtration, the polymer solution is stripped up to 300° F. under a 25" vacuum to obtain a solvent-free copolymer.

The pure polymers are pale amber in color and possess iodine values in the range of 300–325 cg./g. Their viscosities may range from 250 to 25,000 poises depending on the catalyst concentration and diluent ratio employed in the synthesis recipe but the preferred range of viscosity is about 1000–6000 poises at 77° F.

The present invention will be more fully appreciated by reference to the drawing illustrating one embodiment of the same. Referring specifically to the drawing, a waxy crude oil is introduced into distillation zone 1 by means of feed line 2. Temperature and pressure conditions in zone 1 are adapted to remove overhead by means of lines 3 and 4 low boiling hydrocarbon fractions. A waxy distillate fraction is removed as a side stream by means of line 5, while a residual oil is removed by means of line 6.

The waxy distillate is mixed with solvent introduced by means of line 10 and flows through a chilling zone 7 which may comprise a plurality of chilling stages wherein the temperature of the waxy distillate is progressively reduced. A typical operation is to introduce the feed oil into an initial chilling stage at a temperature of about 130° F.; to introduce the feed oil into the second chilling stage at a temperature of about 90° F.; to introduce the feed oil to the third chilling stage at a temperature of about 60° F.; to introduce the feed oil to the fourth chilling stage at a temperature of about 25° F. and to chill the same in the fourth chilling stage to a temperature in the range from about −10 to +10° F. The operation of the respective chilling stages may be varied appreciably and either direct or indirect chilling means utilized. For purposes of illustration, it is assumed that a solvent mixture is used and that the wax-precipitant comprises methylethyl ketone and that the aromatic solvent having a high solubility for oil comprises toluene. It is also assumed that 3 to 4 volumes of total solvent mixture is utilized per volume of waxy oil being dewaxed. The solvent mixture comprises 75% by volume of methylethyl ketone and 25% by volume of toluene.

The entire mixture comprising oily constitutents, crystallized wax constituents, tolene and methylethyl ketone, after chilling is held at the filtering temperature and passed to filtering or separation zone 8 wherein the solid wax particles are segregated from the oily constituents by any suitable filtering or separation means. The filtering zone may comprise drum filters, plate-and-frame presses, centrifuges or suitable equivalent equipment for the separation of the precipitated waxy constituents from the oily constituents. The oil and a portion of the solvent is removed from zone 8 by means of line 9 and the wax cake washed with a wash solvent introduced into filtering zone 8 by means of line 20. Slack wax and solvent are removed from zone 8 by means of line 11 and passed to a distillation zone 12 wherein a separation is made between the wax and the solvent. It is to be understood that other means of separating the solvent from the wax may be utilized if desirable.

The wax substantially free of solvent is removed from separation zone 12 by means of line 13. The solvent mixture comprising methylethyl ketone and toluene is removed overhead from zone 12 by means of line 14 and preferably recycled to the system. The oil-solvent mixture removed from filtering zone 8 by means of line 9 is introduced into a distillation zone wherein a separation is made between the oily constituents and the solvent mixture.

While the drawing illustrates a solvent dewaxing operation with respect to the production of the slack wax, it is to be understood that the waxy constituents may also be separated in a conventional plate-and-frame pressing operation. The slack wax is further refined to crude scale wax in zone 15, which comprises a conventional sweating operation, or solvent deoiling operation, or the like. The oil removed from zone 15 by means of line 36 may preferably be recycled to zone 7. The scale wax is removed from zone 15 by means of line 16 and may be further refined by treatment with sulfuric acid or Fuller's earth, bauxite or other absorbent material, or by hydrogenation under mild treating conditions.

The residue is removed from distillation zone 1 by means of line 6 and passed into a deasphalting zone 16, wherein the asphaltic constituents are precipitated out using a deasphalting solvent, preferably propane which is introduced by means of line 50. The asphaltic constituents are removed by means of line 17, while the deasphalted oil and propane are removed by means of line 18 and passed to chilling zone 19 which may comprise a plurality of chilling zones. Additional propane may be introduced if needed by means of line 30. The chilled mass is passed to filtering or separation zone 21 by means of line 22 wherein a separation is made between the oily constituents and the precipitated wax particles. A solvent-oil stream is removed by means of line 23 while the wax constituents are removed by means of line 24. While these waxy constituents may be utilized as such, it is preferred in order to reduce the concentration of the oil to add additional solvent such as propane by means of line 25 and to re-chill the mass in chilling zone 26. The solvent is removed from the precipitated wax particles in filtering zone 27 and withdrawn by means of line 28. The waxy constituents are introduced to distillation or equivalent zone 29, wherein the remaining portions of the solvent are separated from the microcrystalline wax. The solvent is removed by means of line 30 while the oil-free, solvent-free, microcrystalline wax is removed by means of line 31.

In accordance with the concept of the present invention, styrene and butadiene are polymerized in zone 50 as hereinbefore described. In accordance with the present invention a portion of the copolymer is blended by means of line 51 with scale wax in line 16, and the mixture heated in zone 53 to secure thorough mixing. A portion of the copolymer may be also blended with the microcrystalline wax segregated by means of line 31. This latter mixture is heated in zone 54 to secure adequate mixing.

The present invention may be more fully understood by the following examples illustrating the same.

EXAMPLE

A number of wax blends were prepared which contained a copolymer of styrene and butadiene. The copolymer had the following inspections:

Intrinsic viscosity_____ 0.18.
Iodine value_____ 315 cg./g.
Viscosity @ 77° F_____ ca. 3,000 poises.
Color_____ 3 Gardner Scale.

The physical properties of the resulting blends were as follows:

*Physical properties of copolymer—wax blends*

| Composition Number | | | | Penetration, 77° F./100 g./5″ ASTM |
|---|---|---|---|---|
| 1 | Blank Wax | Paraffin Wax (Saybolt M. Pt.) | 131.8° F. | 10 |
| | | Viscosity at 250° F. | 2.44 cs. | |
| 2 | 1% Copolymer added | Paraffin Wax M. Pt. | 132.0° F. | 12 |
| | | Vis. at 250° F. | 2.77 cs. | |
| 3 | 5% Copolymer added | Paraffin Wax M. Pt. | 131.8° F. | 16 |
| | | Vis. at 250° F. | 4.29 cs. | |
| 4 | 20% Copolymer added | Paraffin Wax M. Pt. | 131.3° F. | 22 |
| | | Vis. at 250° F. | 7.27 cs. | |
| 5 | Microcrystalline Wax | Saybolt M. Pt. | 127.8° F. | 10 |
| | | Vis. at 250° F. | 2.44 cs. | |
| 6 | 1% Polymer Added to (5) | M. Pt. | 127.8° F. | 13 |
| | | Vis. at 250° F. | 2.97 cs. | |
| 7 | 5% Polymer Added to (5) | M. Pt. | 127.5° F. | 14 |
| | | Vis. at 250° F. | 4.13 cs. | |

The adhesiveness of the blends were determined with the following results:

*Effect of copolymer on adhesion of wax to paper*

| Blend No. | Consistency | Adhesiveness | Fiber Length on Kraft |
|---|---|---|---|
| 1 | Solid | Poor | Very Poor. |
| 2 | do | Fair | Poor. |
| 3 | do | Good | Good. |
| 4 | Soft-Stringy | Very Good | Very Good. |
| 5 | Solid | Fair | Fair. |
| 6 | do | Very Good | Very Good. |
| 7 | do | do | Do. |

From the above it is apparent that the copolymer of styrene and butadiene appreciably improves the adhesiveness or tackiness of the wax, as well as the fiber length, when coated on paper or used as a laminate.

The quantity of copolymer, styrene and butadiene used may be varied appreciably in the wax composition. The quantity is preferably in the range from about 1–25%. When employing microcrystalline wax, the quantity is preferably in the range from about 1–5%.

As pointed out heretofore, a preferred composition comprises the use of polyethylene in conjunction with the copolymer of styrene and butadiene in wax compositions. It is preferred that the polyethylene have a molecular weight in the range from about 7000 to 25,000. The amount of polyethylene utilized may also be varied appreciably but preferably is in the range from about 1 to 10% by volume based upon the total wax composition.

The following example illustrates this adaptation of the present invention.

EXAMPLE

A blend of 7000 to 12,000 molecular weight of polyethylene (3%) and copolymer of styrene and butadiene (2%), and paraffin wax of 122° F. melting point (95%) was tested along with other compositions. The results of these tests are as follows:

*Wax blends, paper*

| | Paraffin Wax (122° F.) | Paraffin Wax +3% 12,000 M. Wt. polyethylene | Paraffin Wax +3% 12,000 M. Wt. polyethylene and 2% copolymer |
|---|---|---|---|
| Coating temp., °C | 150 | 150 | 150. |
| Wt. of Coating, lbs. per ream (3,000 sq. ft.) | 30 | 31 | 31. |
| Tear Strength (Elmsdorf), p. s. i | 5.1 | 6.8 | 7.6. |
| Moisture Vapor Permeability 5. H₂O/100 sq. in. per 24 hrs. @ 100°F. and 95% relative humidity (creased). | 0.47 | 0.60 | 0.37. |
| Bursting strength of paper, p. s. i | 440 | 485 | 510. |
| Adhesion of wax to paper under flex at −40° | Poor | Very poor | Very good. |

From the above it is apparent that the polyethylene in conjunction with the copolymer of styrene and butadiene produced excellent wax compositions.

Another adaptation of the invention is to employ in conjunction with the copolymer from 0.1 to 0.5% maleic anhydride. This anhydride imparts improved wetting properties to the copolymer.

What is claimed is:

1. A wax composition which comprises at least 75% by volume of a hydrocarbon wax of a melting point of about 122° F. to about 180° F. and a sufficient quantity of a copolymer oil consisting essentially of about 15% to 25% styrene and about 75% to 85% butadiene to impart improved adhesive and tackiness properties thereto; said copolymer having an intrinsic viscosity of about .08 to about .30.

2. Composition according to claim 1 in which the wax is a paraffin wax.

3. Composition according to claim 1 in which the wax is a microcrystalline wax.

4. Composition according to claim 1 in which the wax has an oil content of below about 0.5%.

5. Composition according to claim 1 in which the wax has a melting point between about 122° to 180° F.

6. Composition according to claim 1 which further contains about 1 to 10% by volume based on total composition of polyethylene having a molecular weight between about 7,000 to 25,000.

7. Composition according to claim 1 in which the copolymer oil has been modified with a sufficient amount of maleic anhydride to improve its wetting properties.

8. Composition according to claim 1 which contains about 1 to 25% of the copolymer oil.

9. Composition according to claim 1 in which the copolymer oil has a viscosity at 77° F. between about 1000 to 6000 poises.

10. Composition according to claim 1 in which the copolymer oil consists essentially of about 20% styrene and about 80% butadiene.

11. A wax composition which comprises at least 75% by volume of a paraffinic wax of a melting point of about 122° F. to about 180° F. and a sufficient quantity of a copolymer oil of about 20% styrene and about 80% butadiene to impart improved adhesive and tackiness properties thereto; said copolymer oil being present in the amount of about 5% to 25% by volume and having an intrinsic viscosity of about .08 to about .30 and said copolymer oil being substantially free from sulfur compounds.

12. A process of preparing a wax composition having improved adhesive and tackiness properties which comprises separating from a waxy crude oil a waxy distillate fraction, de-oiling said fraction to produce a hydrocarbon wax having less than about 0.5% oil content and a melting point between about 122° to 180° F. and blending said wax with about 1 to 25% of a copolymer oil of about 75 to 85% butadiene with about 15 to 25% styrene, said copolymer oil having an intrinsic viscosity between about 0.08 and 0.30.

13. Process according to claim 12 in which the copolymer oil is produced by copolymerization of the butadiene and styrene in the presence of a sodium catalyst at a polymerization temperature of about 120° F. for a time sufficient to produce a copolymer oil having a viscosity at 77° F. between about 1000 to 6000 poises.

14. Process according to claim 12 in which the wax is blended with an admixture of about 1 to 25% of the copolymer oil and about 1 to 10% by volume, based on total composition, of polyethylene having a molecular weight between about 7,000 to 25,000.

15. A method of preparing a wax composition having improved adhesive and tackiness properties which comprises separating from a waxy crude oil a waxy distillate fraction, treating said fraction by solvent extraction and chilling to produce a substantially de-oiled microcrystalline wax, removing the solvent from the wax so produced whereby to recover a substantially solvent-free microcrystalline wax having a melting point of about 122° F. to about 180° F., blending said wax with less than about 25% of a copolymer oil of about 75% to 85% butadiene and about 15% to about 25% styrene; said copolymer oil having been produced by employing a sodium catalyst at a polymerization temperature of about 120° F. for a time sufficient to produce a substantially pure copolymer oil having an intrinsic viscosity of about .08 to .30; said copolymer oil being substantially free from sulfur compounds.

16. A method of preparing a wax composition having improved adhesive and tackiness properties which comprises separating from a waxy crude oil a waxy distillate fraction, treating said fraction by solvent extraction and chilling to produce a substantially de-oiled microcrystalline wax, removing the solvent from the wax so produced whereby to recover a substantially solvent-free, microcrystalline wax having a melting point of about 122° F. to about 180° F. and adding thereto a combination of from about 1 to 10% by volume of polyethylene and about 1 to 10% of copolymer oil of about 80% butadiene and about 20% styrene; said copolymer oil having been produced by contacting the butadiene and styrene in the presence of a sodium catalyst and at a polymerization temperature of about 120° F. for about 6 hours whereby to produce a substantially pure copolymer oil having an intrinsic viscosity of about .08 to .30 and an iodine value of about 300–325 cg./g.

17. A method of preparing a wax composition having improved adhesive and tackiness properties which comprises separating from a waxy crude oil a waxy distillate fraction, treating said fraction by solvent extraction and chilling to produce a substantially de-oiled microcrystalline wax, removing the solvent from the wax so produced whereby to recover a substantially solvent-free microcrystalline wax having a melting point of about 122° F. to about 180° F., blending said wax with about 1 to 25% of a copolymer oil of about 75% to 85% butadiene and 15% to less than about 25% styrene; said copolymer oil having been produced by employing a sodium catalyst at a polymerization temperature of about 120° F. for a time sufficient to produce a substantially pure copolymer oil having an intrinsic viscosity of about .08 to .30; said copolymer oil being substantially free from sulfur compounds, said copolymer oil having been reacted with from about .1% to about .5% of maleic anhydride.

18. A method of preparing a wax composition having improved adhesive and tackiness properties which comprises separating from a waxy crude oil a waxy distillate fraction, treating said fraction by solvent extraction and chilling to produce a substantially de-oiled microcrystalline wax, removing the solvent from the wax so produced whereby to recover a substantially solvent-free microcrystalline wax having a melting point of about 122° F. to about 180° F., blending said wax with less than about 25% of a copolymer oil of about 75% to 85% butadiene and about 15% to about 25% styrene; said copolymer oil having been produced by employing a sodium catalyst at a polymerization temperature of about 120° F., in the presence of a sufficient amount of dioxane and for a time sufficient to produce a substantially pure copolymer oil having an intrinsic viscosity of about .08 to .30.

References Cited in the file of this patent

UNITED STATES PATENTS

| | | |
|---|---|---|
| 2,541,689 | Carson | Feb. 13, 1951 |
| 2,551,087 | Barnhart et al. | May 1, 1951 |
| 2,560,195 | Smith et al. | July 10, 1951 |
| 2,586,594 | Arundale et al. | Feb. 19, 1952 |
| 2,612,480 | May | Sept. 30, 1952 |
| 2,640,782 | Bloch et al. | June 2, 1953 |